United States Patent [19]
Stroop

[11] 3,766,666
[45] Oct. 23, 1973

[54] UTERINE SIMULATOR TRAINER

[75] Inventor: John Harry Stroop, Brooklyn, N.Y.

[73] Assignee: A. H. Robins Company, Incorporated, Richmond, Va.

[22] Filed: Oct. 13, 1971

[21] Appl. No.: 188,960

[52] U.S. Cl. .................................................. 35/17
[51] Int. Cl. .......................................... G09b 23/30
[58] Field of Search .................. 35/17, 51; 128/130, 128/131

[56] References Cited
UNITED STATES PATENTS
| | | | |
|---|---|---|---|
| 497,584 | 5/1893 | Lloyd | 35/51 |
| 2,132,226 | 10/1938 | Wahlberg | 35/17 |
| 2,232,258 | 2/1941 | McCormick | 128/131 |
| 2,284,888 | 6/1942 | Arneill | 35/17 |
| 3,376,659 | 4/1968 | Asin | 35/17 |
| 3,645,265 | 2/1972 | Majzlin | 128/130 X |

*Primary Examiner*—Harland S. Skogquist
*Attorney*—G. William King

[57] ABSTRACT

A training device for instructing in intrauterine contraceptive techniques and methods for constructing same are disclosed.

2 Claims, 6 Drawing Figures

Patented Oct. 23, 1973
3,766,666
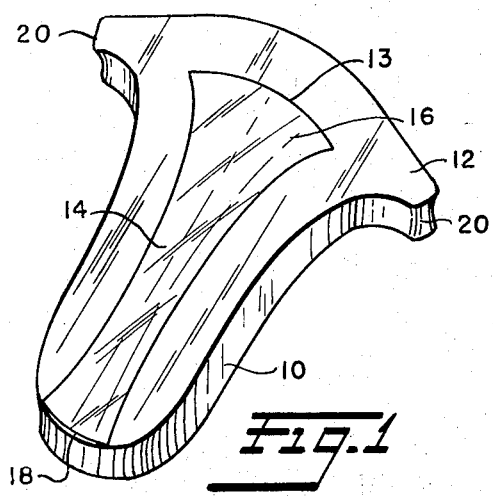
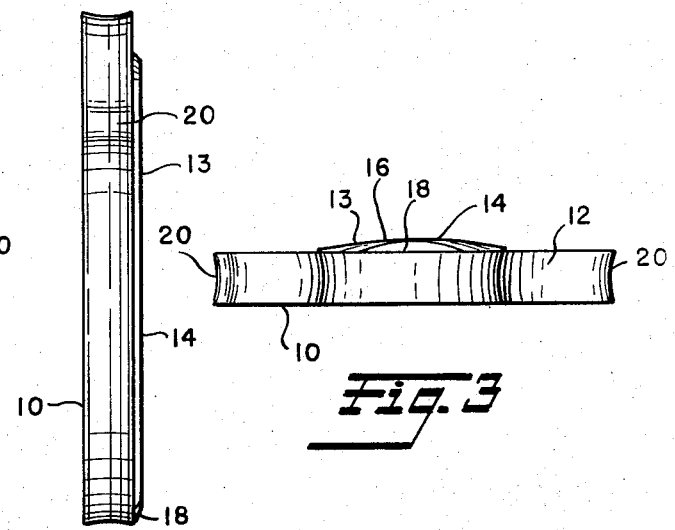
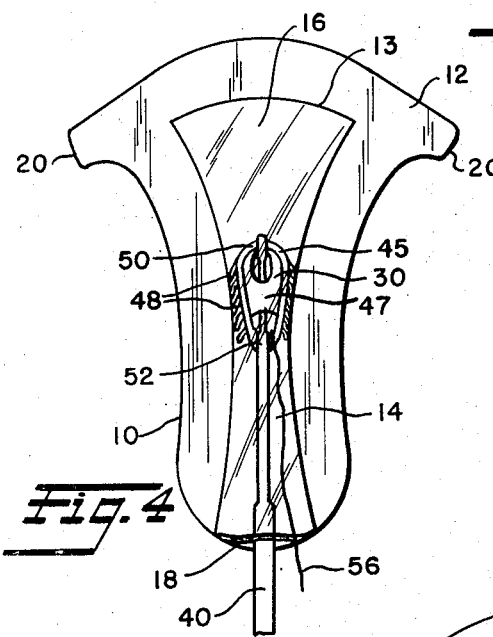
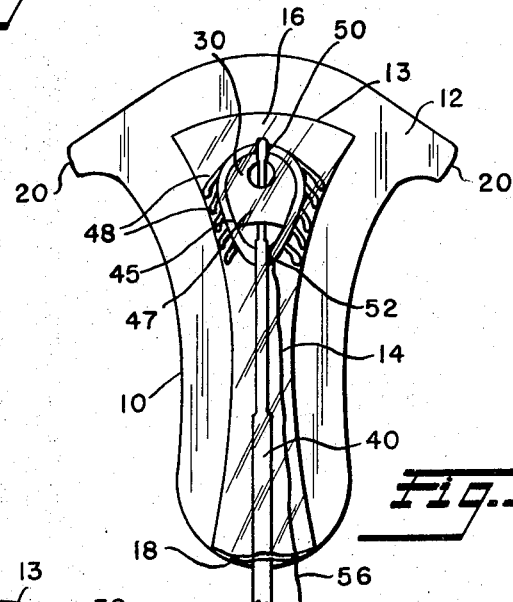
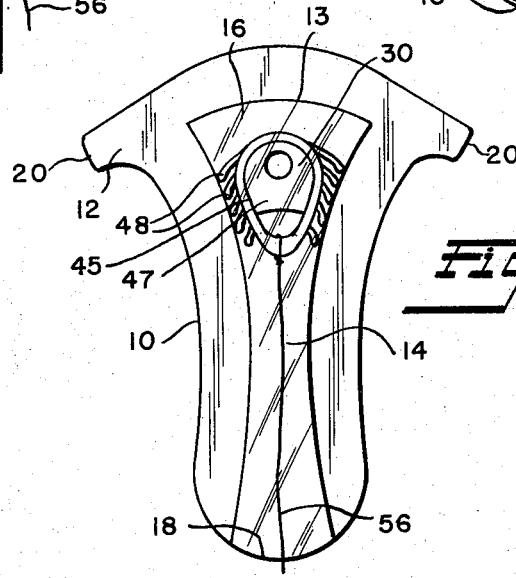

UTERINE SIMULATOR TRAINER

This invention relates to a novel training device for instructing medical personnel on the insertion of an intrauterine contraceptive device (IUD) in women. More particularly, the invention relates to a flexible teaching device approximately the size and shape of a human uterus and being partially transparent to permit visual observation of a simulated insertion of an IUD.

An IUD is inserted in the uterus by means of an inserter to which it is loosely attached or otherwise held. When the insertion into the uterine cavity has been completed and the IUD properly located in the fundal plane, the inserter is disengaged from the IUD and removed. Heretofore, instructions on IUD insertion have been given verbally with numerous cumbersome chart and diagram displays requiring the focus of instructor and observer on various two dimensional drawings depicting path and progress of insertion during a demonstration that requires three dimensional description. Common variations in uteri include those having curvatures with a backward bend (retroversion) and those having a forward bend (anteflection) have required further drawings and illustrations. The device of the present invention being three dimensional in scope nullifies the need for charts and diagrams as part of the aforementioned instructions.

The primary object of this invention is to provide a teaching device, for instructing in intrauterine contraception techniques, in the form of a flexible hand sized replica of the human uterus. The cervical canal and uterine cavity can be seen through a transparent portion of the device, and manual insertion of IUD into the uterine cavity may be easily followed to visually observe the progress of insertion, stress interaction between IUD and cervical canal wall, placement of IUD in the uterine cavity, withdrawal of IUD insertion instrument and removal of IUD.

Other objects are to provide a teaching device in the form of a hand-sized replica of a human uterus which may be flexed to simulate retroversion and anteflection which utilizes external simulated Fallopian tubes as an aid for hand gripping, and a teaching device with pliable cervical canal having simulated friction characteristic of in vivo insertion.

Other objects will become apparent to one skilled in the art as the disclosure of the best mode of carrying out the invention is more fully made in connection with the accompanying drawing wherein;

FIG. 1 illustrates a general top oblique elevational view of the preferred IUD teaching device of the invention as it might appear to an observer in the hand of an instructor.

FIG. 2 is a side view thereof.

FIG. 3 is an end view thereof taken from the end simulating the cervical os.

FIG. 4 is a top view demonstrating insertion of a particular IUD known as the Dalkon Shield midway into the uterus by means of an inserter, the IUD and inserter being in no way part of the invention hereinafter described.

FIG. 5 is a top view demonstrating full insertion of the Dalkon Shield still attached to inserter.

FIG. 6 is a top view showing full insertion of the Dalkon Shield having inserter withdrawn.

As shown, teaching device 10 is comprised of a main body member 12 in the approximate shape of the main longitudinal section of a human uterus, and a transparent member 13 attached to body 12 about its edges to define a cervical canal 14 and uterine cavity 16. The narrow cervical portion is open to form a cervical os 18. Lobes 20 correspond to closed Fallopian tubes and present points for functional identification and aid in gripping the device. Transparent member 13 serves as a window for IUD 30 insertion demonstration through the opening 18 into cervical canal 14 and cavity 16.

In FIGS. 4 and 5 the teaching device 10 of the present invention is shown in conjunction with a flexible Dalkon Shield and an inserter 40. The flexible, plastic IUD 30 is comprised of an outer ring 45, a membrane 47 extending across the central portion of ring 45 and a plurality of spurs 48 extending from opposite sides of ring 45. The inserter 40 is a curved, slender, elongated instrument having notches at 50 and 52 for holding the IUD 30 during insertion. FIG. 4 is an approximate view to an observer of partially inserted IUD 30 and demonstrates the ability of the teaching device to illustrate the distortion of an IUD during movement through cervical canal 14. FIG. 5 illustrates an observer's view of a fully inserted IUD 30 still attached to the inserter 40 into the high fundal area of the uterine cavity. FIG. 6 is observer's view of fully inserted IUD 30 having been detached from inserter 40 by rotating said inserter 90° about its longitudinal axis to disengage it from IUD and withdrawing the inserter. Telltale and withdrawal string 56 remains tied to IUD 30.

The teaching device of the invention may be suitably fabricated from layers of flexible plastic having suitable qualities of density, texture, color, flexibility, opacity and friction characteristic in one or more layers as desired. However, the preferred material for body 12 is ⅛ inch to ⅜ inch in depth capped with a layer of transparent vinyl sheet attached by welding of adhesive about its edges as described. Optionally, the foamed layer may be beveled at its edges, capped top and bottom with smooth vinyl before adding the transparent member resembling cervical canal and uterine cavity.

While the drawings and description have been adapted to demonstrate a particular IUD known as the Dalkon Shield and its inserter, both hereinabove described, it is intended that the teaching device of this invention shall not be limited in any way because of reference to a specific IUD.

The teaching device of this invention resembles the uterus in shape and proportion; however, it need be only of general appearance of the uterus. Preferably, the teaching device is about 2-½ inches to 5 inches in length and the transparent member covering a space large enough to permit passage of an IUD being demonstrated through a simulated cervical canal and seating of said IUD in a simulated uterine cavity.

Thus, the preferred teaching device of the invention is comprised of a flexible body in the approximate shape of a human uterus, having a flexible transparent member in approximately the shape of the cervical canal and uterine cavity attached about its edges through which IUD insertion is observable, the transparent member serving together with the area beneath the member as an interior uterine boundary wall for canal and cavity and forming an opening at the cervical end of said membrane simulating the cervical os.

The shape of the transparent member resembling that of a cervical canal and uterine cavity and attached about its edges and forming part of said flexible body is in the shape of a cervical canal and uterine cavity taken in the sagittal plane including points in the Fallopian tubes and cervical canal, thus presenting a uterine cavity shape normally in the plane which holds IUD on full insertion. The shape of the symmetrical cervical canal may be dilated laterally to the surface of attachment or dilated laterally and in an arc above the plane of attachment.

In its preferred shape the novel training device for instructing in intrauterine countraception techniques of this invention resembles a section of a human uterus taken lengthwise to the cervical canal having lobes resembling Fallopian tubes and having a transparent member in the shape of a uterine cavity and dilated cervical canal taken from a sagittal plane passing through the Fallopian tubes and cervical canal attached about its edges to one surface of the section simulating an interior wall of the uterus in the shape of a cervical canal and uterine cavity and forming an opening at the cervical end simulating the cervical *os*.

The transparent member need not, however, in its generalized usage be attached to a section or a flat surface. It may, for example, be on the surface of a fully replicated uterus approximately perpendicular to a line between the Fallopian tube lobes, with instructor and student projecting mentally canal and cavity to the inside of the uterus.

What I claim is:

1. A teaching device for instructing in intrauterine contraception technique comprising a flexible body having a planar top surface in the approximate shape of a human uterus having a transparent member in the approximate shape of a cervical canal and uterine cavity attached about its edges to said body and forming an interior boundary wall for said canal and cavity and an opening at the cervical end of said body simulating a cervical os, said body bearing identification lobes corresponding to Fallopian tubes and said canal and opening being dilated in the plane of attachment.

2. A teaching device of claim 1, said shape of cervical canal and uterine cavity being taken from a sagittal plane passing through the cervical canal and Fallopian tubes.

* * * * *